May 17, 1966 G. R. KINGSBURY ETAL 3,251,119
METHODS OF MAKING DUAL MATERIAL FLANGE BEARINGS
Filed Sept. 17, 1964

INVENTORS
GEORGE R. KINGSBURY
CHARLES H. JUNGE
BY WILLIAM A. WEINKAMER
RAYMOND L. SLATER

*Elber J. Hyde*
ATTORNEY

United States Patent Office 3,251,119
Patented May 17, 1966

3,251,119
METHODS OF MAKING DUAL MATERIAL FLANGE BEARINGS
George R. Kingsbury, Mayfield, Charles H. Junge, University Heights, William A. Weinkamer, Mentor, and Raymond L. Slater, Novelty, Ohio, assignors to Clevite Corporation, a corporation of Ohio
Filed Sept. 17, 1964, Ser. No. 397,251
16 Claims. (Cl. 29—149.5)

This invention pertains to methods for making dual material flange bearings.

Dual material flange bearings are sleeve bearings which incorporate the features of a strong, high-load-carrying, barrel liner which has good fatigue resistance properties, combined with a soft babbitt or white metal flange or thrust face which has superior surface action properties for resistance to seizure and which has a high degree of conformability.

The dual material flange bearing is particularly adapted for automotive applications, for example engine sleeve bearings, wherein it is highly desirable to have the plane of the flange face or faces perpendicular to the axis of the barrel. In the past the importance of this relationship has been recognized, but in mass production at low cost it is impossible always to achieve a perfectly perpendicular condition.

In the dual material flange bearing of the present invention the barrel liner is made of a high-load-carrying bearing material, with or without an overlay plate, and the flange face(s) is made of a conformable cast white metal or babbitt having excellent surface action properties. The high conformability of the metal on the flanges permits the axis of the assembled bearing bore and the plane of the flange faces to be off-perpendicular within reasonable tolerances for inexpensive mass production. Also, with the high degree of conformability the surface roughness of the mating part can be higher, thereby reducing the cost of machining the mating part. Since the flanges do not have to withstand high unit cyclic loads, the use of cast white metal or babbitt on the flange faces improves the bearing action thereof and also solves the problem of conformability and misalignment.

The present invention for the first time in the art of making flange bearings provides a practical, inexpensive method of forming flange bearings, wherein the barrel may be made of steel-backed high-load-carrying metal with or without an overlay plate such as aluminum, cast red metal, sintered red metal, or sintered red metal with infiltrated white metal, and the surface of the flange or flanges of the bearing may be comprised of conformable cast white metal or babbitt.

It is therefore an object of the present invention to provide a dual material flange bearing and methods of making same wherein the bearing material of the barrel is formed of a high-load-carrying material and wherein the bearing material on the flange or flanges is made of conformable cast white metal or babbitt.

Another object of the invention is to provide methods of making practical dual material flange bearings for automotive engine use, wherein the bearing has highly conformable flange faces to reduce some stringent engine tolerances and surface smoothness requirements.

Another object of the present invention is to provide a number of practical methods for manufacturing the strip material from which dual material flange bearings may be made.

Reference is made to my copending application Serial No. 397,236, filed September 17, 1964, for dual material flange bearings made by these methods.

For a better understanding of the present invention, together with other and further objects thereof, reference is made to the following description taken in connection with the accompanying drawings, and its scope will be pointed out in the appended claims.

With reference to the drawings there is shown in FIGURE 1 an isometric view of a typical flange bearing.

FIGURE 6 is a sectional view showing the steel strip onto which powdered bronze has been deposited.

FIGURE 7 shows the strip after the powdered bronze has been sintered and babbitt material has been overcast thereon.

FIGURE 8 is a sectional view similar to that shown in FIGURE 7 but showing an alternative arrangement wherein the sintered bronze covers the entire surface area of the steel strip.

An aspect of the present invention lies in the provision of methods for making a dual material flange bearing, wherein the bearing comprises a steel backing layer having a barrel portion and one or more flange portions. A layer of high-load-carrying bearing material such as aluminum or bronze red metal is adhered to the barrel portion of the steel backing member and forms the high-load-carrying portion of the bearing. A layer of conformable cast white metal or babbitt bearing material is adhered to the flange portions of the steel backing member and forms the thrust surface for the flange portions of the bearing.

A further aspect of the present invention lies in methods of making a strip of material from which dual material flange bearings may be made. The strip material in large coils may be sold as such throughout the world to licensees who thereafter form dual material flange bearings therefrom in accordance with the present invention.

Figures 1, 2:
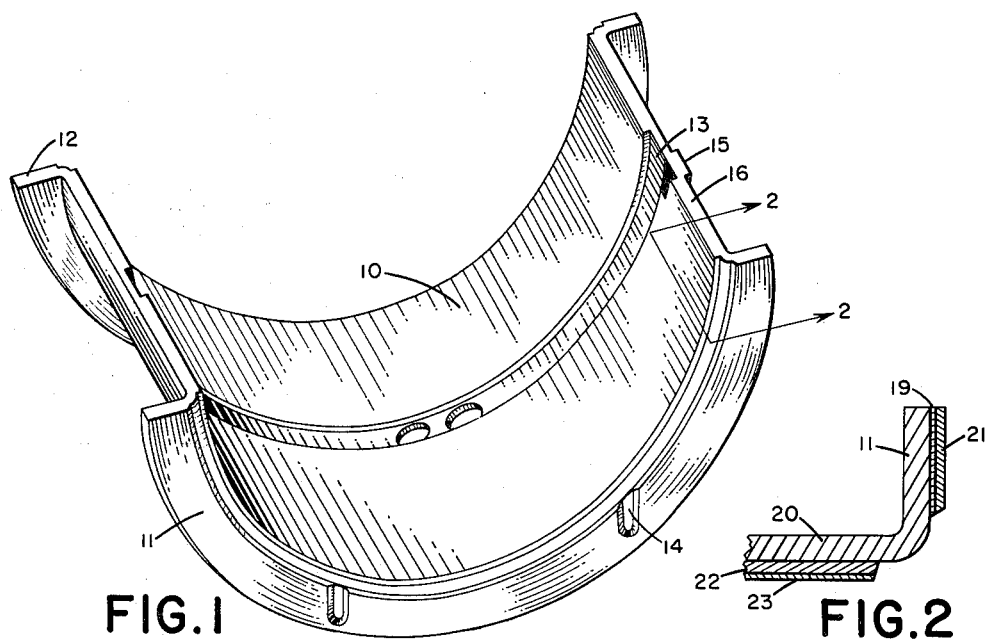
FIGURE 2 is a fragmentary view taken along line 2—2 of FIGURE 1.

With reference to the drawings there is shown in FIGURES 1 and 2 a dual material flange bearing. The bearing is comprised of a barrel or radial load carrying portion 10 and one or more flanges or thrust faces 11, 12, the planes of which should be approximately perpendicular to the axis of the barrel 10. For use in internal combustion engines an oil groove 13 may be provided in the barrel face and oil grooves 14 may be provided in flange faces. A notched portion 15 is provided on one or more of the parting line faces 16 to locate the bearing in position in the assembled unit, as is well known in the automotive art.

The bearing is comprised of a steel backing layer 20, to the flange face 11 of which is adhered a comformable layer of white metal or of lead or tin base babbitt 21, with or without a thin layer of bronze 19 between the steel and the conformable layer 21, and to the barrel portion 10 of which is adhered a layer 22 of strong high-load-carrying bearing material, which layer 22 may or may not be provided with a microthin plated layer 23 of bearing material on the surface thereof.

It is essential in the production of fine internal combustion engine bearings that the plane of the flange face be as perpendicular as possible to the axis of the barrel.

When the bearing is assembled in an engine the barrel face fits tightly around a crankshaft, and the flange face engages a mating surface on the crankshaft. If the plane of the flange face is not exactly perpendicular to the axis of the barrel, the entire area of the flange face does not engage its mating surface.

In order to provide a more comfortable flange face than has heretofore existed, the present invention provides highly conformable bearing metal flange faces, together with a strong, high-load carrying, fatigue resistant bearing face in the bore of the bearing.

In order to provide an inexpensive dual material flange bearing several practical methods have been devised. All of these methods are hereinafter described in detail. Briefly, in Method No. 1 there is produced a cast fatigue resistant red metal barrel with cast conformable bearing metal flanges. In Method No. 2 there is produced a sintered fatigue resistant red metal barrel with cast conformable bearing metal flanges. In Method No. 3 there is produced a barrel of fatigue resistant sintered red metal infiltrated with cast white metal and with conformable cast bearing metal flanges. In Method No. 4 strong, fatigue resistant aluminum or aluminum alloy is adhered to the steel backing layer and cast conformable white metal or babbitt bearing material is adhered to the flanges. The aluminum or aluminum alloy may be cast or clad onto the steel strip or it may be aluminum or aluminum alloy powder adhered to the steel strip by known sintering techniques. In all four methods cast babbitt or white metal is adhered to the flanges of the bearing to provide a conformable, relatively soft bearing material. The term "white metal bearing material" is understood to include lead and tin base babbitts for bearing applications, and it also includes the other low melting point bearing materials and alloys such as antimony, bismuth, and cadmium. Alloys including zinc are also included though zinc per se is not a good bearing material.

In all methods a steel backing member is provided to which a layer of strong, fatigue resistant, relatively nonconformable bearing material such as bronze or aluminum is applied to form a composite strip. The strong layer is worked, as by a contour weir or by rolling or milling, depending upon how the layer is applied, to reduce its thickness over those areas which eventually become the flange portions of the finished bearing. The amount of reduction in the thickness of the bronze layer at the flange areas may be to the extent that none of the strong layer remains on the steel strip, or if desired, only a very thin portion of the strong layer may remain on the steel strip at the flange portions. Thereafter the weaker, relatively conformable white metal bearing material is cast onto at least the flange portions of the composite strip, and, if desired for ease of manufacture, the white metal may also cover the barrel area of the strip. However, if it does cover those portions which eventually become the barrel of a finished bearing it is preferable in the further steps of making the bearing that it be removed to expose the strong, fatigue-resistant metal. However, a thin overlay layer of the white metal may be caused to remain on the barrel area if desired. After the white metal has been cast onto the compososite strip, the strip may be milled and/or skived to required thickness and then the bearing blanks are cut from the strip. From the blanks, bearings may be made by methods known in the art, such for example by the roll-form method or by the form and flare method.

Method No. 1—Cast barrel, cast flanges

Figure 3:
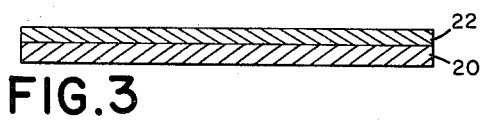
FIGURE 3 is a transverse sectional view showing an early step in the method of making the composite strip material from which dual flange bearings may be made.
Figure 4:
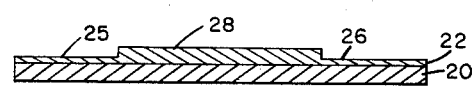
FIGURE 4 is a sectional view similar to FIGURE 3 after a milling step has been performed on the strip shown in FIGURE 3.
Figure 5:
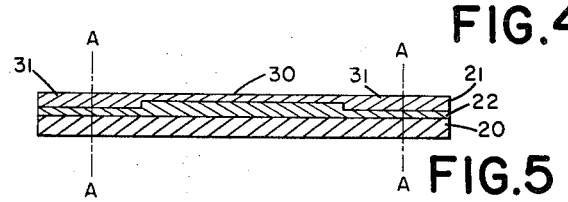
FIGURE 5 is a sectional view after babbitt material has been overcast onto the milled strip.
Figure 9:
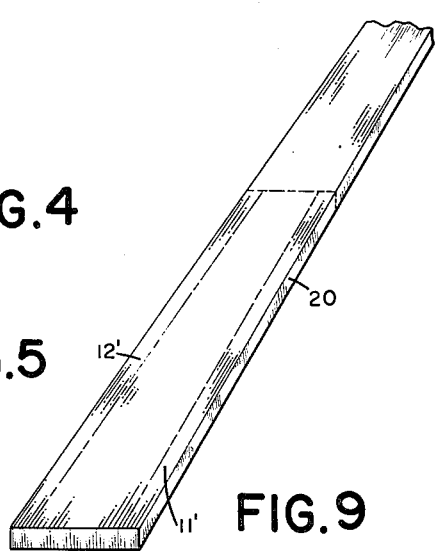
FIGURE 9 is an isometric view showing the strip and orientation of bearing blanks cut therefrom.

FIGURES 3 to 5 illustrate the method of providing strip material from which dual material flange bearings may be manufactured wherein the barrel portion of the bearing may be made of cast red metal or cast aluminum material and the flange portions of the bearings are made of cast white metal material. With reference to FIGURE 3 there is shown a strip of steel material 20 of a width slightly greater than the axial length of the bore of the bearing to be made, plus enough for one or two flanges, as the case may be. As shown in FIG. 9 the width is sufficient for two flanges 11' and 12'. The bearing blanks are stamped from the strip with such orientation that the axis of the barrel is transverse to the strip. Onto the top surface of the steel strip 20 there is adhered a layer of cast aluminum or aluminum alloy or bronze alloy 22. Methods are known and well developed for casting these materials on steel strip. The composite strip shown in FIGURE 3 is then machined such as by profile milling to the contour shown in FIGURE 4. The strong, fatigue resistant material of the outside flange edge areas 25 and 26 is thin compared to the central barrel area 28. It is not essential to retain the thin bronze layer in the flange areas 25 and 26 but it is preferable to do so in order to extend the life of the milling cutters which are used in this step. The thicker strong bearing material area 28 eventually becomes the barrel portions of the formed sleeve bearings, and the thinner bronze areas 25 and 26 become flange portions of finished bearings. The profile milled composite strip, shown in FIGURE 4, then has a layer of white metal bearing material 21 overcast thereon preferably though not necessarily throughout its entire width, as shown in FIGURE 5. During the white metal overcasting step the top surface of the composite strip may be wiped clean so that it is level and substantially parallel to the surface of the steel strip 20. A thin layer of white metal 30 may be caused to remain above the thicker layer of strong bearing material 28 in the barrel area by not wiping it clean during the casting operation, but at the flange areas 25 and 26 the white metal layer 31 is substantially thicker. These thicker white metal portions 31 eventually become the flange faces of the formed sleeve bearings. After the white metal overcast the composite strip is trimmed along the construction lines A, thereby providing the long composite strips shown in FIGURE 9. From this composite strip blanks are then cut and the flange bearings are formed by methods known to the art.

In the event that the composite strip is to be formed of bronze alloy overcast with a white metal alloy having a high antimony content, it is important that the bronze alloy be completely removed at the flange areas 25 and 26. This is because the antimony in the white metal would react with the copper in the bronze alloy to form a brittle copper-antimony reaction layer which would prevent the white metal from being strongly bonded to the underlying material.

Method No. 2—Sintered barrel, cast flange

Figure 6:
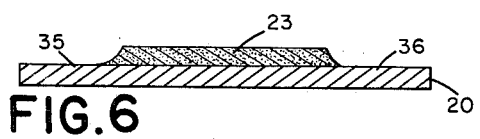
FIGURES 6, 7 and 8 are sectional views showing another method of forming the composite strip from which the dual material flange bearings may be made.
Figure 7:
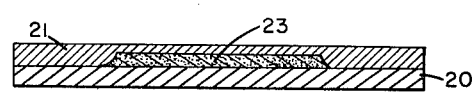
Figure 8:
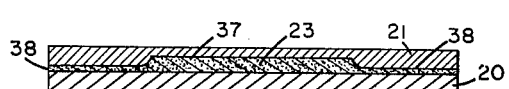

FIGURES 6 and 7 show sequence steps in the method of forming strip material out of which flange bearings may be made and wherein the finished bearings will have a sintered barrel portion and cast white metal flanges. FIGURE 8 shows an alternative step in the method of making a bearing having a sintered barrel and a cast white metal flange.

In FIGURE 6 there is shown a steel backing member 20 onto which has been spread bronze or aluminum alloy powder 23, preferably using a profile contour weir so that substantially bare steel is provided in the flange areas 35, 36. Thickness allowance is made in the powder layer 23 to provide for shrinkage in a subsequent sintering-rolling operation, as is known in the art. The steel strip with the powder layer 23 is then passed through a sintering furnace with a reducing atmosphere to firmly bond the powder to the steel back. The strip is then rolled to reduce the powder layer and thereafter is resintered and rolled to achieve high density of the sintered layer and to improve bond strength. The strip is then transferred to a white metal casting line where white metal bearing material 21 is overcast across the entire width of the strip, preferably though not necessarily including thin layers of the white metal material over the center barrel area 23. The strip may then be trimmed and severed, as previously described, to provide a long strip of composite material the center or barrel portion of which is comprised of three layers of material, and the edge or flange portions of each of which are comprised of two layers of material. From these composite strips dual material flange bearings may be made in accordance with the methods known in the art, and preferably though not necessarily, the white metal 21 above the sintered barrel area is removed.

With reference to FIGURE 8 there is shown an alternative method wherein the powder 23 is spread completely across the steel strip 20 to provide a relatively thicker barrel portion 37 and relatively thin flange layers 38. Thereafter the strip is sintered and rolled as previously described, and it is then overcast with white metal bearing material 21 throughout its entire width. This results in thicker layers of white metal at the flange areas. Thereafter the bearings are formed from the strip stock, as previously described, and the white metal may be removed from the barrel area.

*Method No. 3—Sintered and infiltrated barrel, cast flange*

The third method for the economical production of strip for dual material flange bearings comprises sintering bronze powder 23 on the barrel area of the steel strip 20 without rolling to high density, and thereafter while casting the white metal flange areas, simultaneously infiltrating the sintered red metal grid with the same white metal material. In this method a steel strip 20 is provided and the sintered bronze powder is applied as in either FIGURE 6 or FIGURE 8. The bronze powder is sintered but if it is rolled at all it is rolled only lightly to control thickness, yet preserve its porosity. Thereafter the entire face of the strip is overcast with molten white metal and is cooled from the back of the steel strip to solidify the white metal and to ensure that the molten bearing metal is infiltrated into the pores of the relatively porous sintered bronze layer. As in FIG. 8 of Method No. 2 the sintered material may extend completely across the face of the steel strip 20, or the sintered material may occupy only that area in the center of the steel strip which eventually becomes the barrel portion of the finished bearing, as is shown in FIGURE 6.

*Method No. 4—Clad or rolled barrel with cast flange*

The fourth method for the economical production of strip material for making dual material flange bearings comprises applying aluminum alloy to the barrel area only of the steel strip, and thereafter casting white metal bearing material on the steel strip to either or both sides of the aluminum alloy barrel area, or the white metal may be cast across the aluminum alloy barrel area. The aluminum or aluminum alloy may be applied as a powder substantially in accordance with the teaching of U.S. Patent 3,104,135, issued to Morrison and Slater and assigned to the assignee of the present application, or it may be applied as an aluminum alloy strip clad to the steel backing member substantially in accordance with the teaching of U.S. Patent 3,093,885, issued to Morrison and Williams and assigned to the assignee of the present application, or other methods known to the art may be used.

The white metal may be cast only to the side of the aluminum barrel area, or, as previously described, it may be cast across the barrel area and the flange areas and thereafter removed by a machining process from the barrel areas, thereby leaving relatively thick flange portions formed of the cast white metal.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

We claim:
1. The method of producing a thin-walled, steel-backed, dual material flange sleeve bearing from a strip of steel which comprises the steps of: applying to the surface of said steel strip a layer of strong, fatigue resistant, relatively hard bearing material to cause said strong bearing material to adhere thereto to form a composite strip, working the strong bearing material portion of said composite strip to form barrel area means of a given thickness and to form flange area means of substantially lesser thickness, casting white metal bearing material which is conformable and relatively softer than the strong, fatigue resistant bearing material composite strip to form a given thickness of said white metal over the stronger bearing material at said barrel area means and to form a greater thickness of said white metal over the flange area means, thereafter forming a flange sleeve bearing from the strip with the barrel area means of said strip forming the barrel of said bearing and with the flange area means of the strip forming the flange means of the bearing, and removing the white metal from the barrel area means, whereby the barrel of the finished bearing is formed of strong bearing material and the surface of the flange means is formed of conformable white metal bearing material.

2. The method of producing a thin-walled, steel-backed, dual material flange sleeve bearing from a strip of steel as set forth in claim 1, further characterized by said layer of strong, fatigue resistant, relatively hard bearing material also being applied to the flange area means of said steel backing member and by said layer of cast, conformable, white metal bearing material being adhered to said layer of relatively hard bearing material.

3. The method of producing a thin-walled, steel-backed, dual material flange sleeve bearing from a strip of steel as set forth in claim 1, further characterized by said layer of strong, relatively hard bearing material being cast on said steel strip.

4. The method of producing a thin-walled, steel-backed, dual material flange sleeve bearing from a strip of steel as set forth in claim 1, further characterized by said layer of strong, relatively hard bearing material being sintered and rolled onto said steel strip.

5. The method of producing a thin-walled, steel-backed, dual material flange sleeve bearing from a strip of steel as set forth in claim 1, further characterized by said layer of strong, relatively hard bearing material being sintered onto said steel strip and by said layer of white metal bearing material being cast onto said sintered layer to infiltrate into the pores thereof.

6. The method of producing a thin-walled, steel-backed, dual material flange sleeve bearing from a strip of steel as set forth in claim 1, further characterized by applying an overlay layer of relatively soft conformable bearing material over the strong, relatively hard bearing material at the barrel area thereof after the white metal material has been removed therefrom.

7. The method of producing a thin-walled, steel-backed, dual material flange sleeve bearing from a strip of steel as set forth in claim 1, further characterized by applying to the surface of said steel strip a layer of strong, fatigue resistant aluminium alloy bearing material to form said composite strip.

8. The method of making a thin-walled, steel-backed, dual material flange bearing, comprising the steps of: providing a length of steel strip, applying to the surface of said steel strip a layer of bronze bearing material to form a composite strip, working the bronze layer of said composite strip to reduce its thickness over the first area means to a given carefully controlled thickness which is substantially greater than the thickness of said bronze layer over said second area means thereof, casting white metal bearing material onto said first and second area means to establish a composite strip of substantially uniform over-all thickness having at least a portion comprised of three layers of different materials and wherein at the first area means the bronze layer is thicker than said white metal bearing material layer and wherein at said second area means the white metal bearing material layer is thicker than said bronze layer, forming a flange sleeve bearing from a longitudinal portion of said strip, said bearing having its barrel portion formed from said first area means of said strip wherein the bronze layer is thicker and having its flange portion formed from said second area means wherein the white metal bearing material layer is thicker, and during said forming operation removing the white metal bearing material layer from said barrel portion.

9. The method of producing strip material for forming thin-walled, steel-backed dual material flange bearings, which comprises the steps of: providing a length of steel strip, applying to the surface of said steel strip a layer of bronze bearing material to form a composite strip having barrel area means and flange area means, working the bronze layer of said composite strip to control the thickness of said composite strip at said barrel area means to a given thickness which is substantially thicker than the thickness of said composite strip at the said flange area means thereof, and casting white metal bearing material onto said flange area means and said barrel area means of said composite strip, whereby at the said barrel area means the bronze layer is thicker than said white metal bearing material layer and whereby at said flange area means the white metal bearing material layer is thicker than said bronze layer.

10. The method of producing strip material as set forth in claim 9, further characterized by said bronze bearing material being cast onto said steel strip.

11. The method of producing strip material as set forth in claim 10, further characterized by said bronze bearing material being cast onto said steel strip throughout both said first barrel area means and said second flange area means.

12. The method of producing strip material as set forth in claim 11, further characterized by machining said bronze layer at said second flange area means to reduce its thickness.

13. The method of producing strip material as set forth in claim 9, further characterized by said bronze bearing material being sintered onto said steel strip.

14. The method of producing strip material as set forth in claim 9, further characterized by said bronze bearing material being applied to the surface of said steel strip in the form of a layer of bronze powder, and said bronze layer being worked by a contoured weir and sintered and rolled to its reduced thickness.

15. The method of producing strip material as set forth in claim 14, further characterized by said bronze layer being applied to the steel strip only at the said barrel area means.

16. The method of producing strip material as set forth in claim 9, further characterized by said babbitt bearing material being cast onto both said first barrel area means where it infiltrates said bronze layer, and said second flange area means.

References Cited by the Examiner
UNITED STATES PATENTS

| | | | |
|---|---|---|---|
| 1,892,173 | 12/1932 | Stockfleth | 29—149.5 |
| 2,124,060 | 7/1938 | Gilman | 29—149.5 |
| 2,124,132 | 7/1938 | Bate et al. | 29—149.5 |
| 3,093,885 | 9/1963 | Morrison et al. | 29—149.5 |
| 3,104,135 | 9/1963 | Morrison et al. | 308—237 |

WHITMORE A. WILTZ, *Primary Examiner.*

THOMAS H. EAGER, *Examiner.*